United States Patent [19]

Haas et al.

[11] Patent Number: 5,446,705
[45] Date of Patent: Aug. 29, 1995

[54] TIME INDICATOR HAVING DISCRETE ADHESIVE

[75] Inventors: David J. Haas; Sandra F. Haas, both of Suffern, N.Y.

[73] Assignee: Temtec, Inc., Suffern, N.Y.

[21] Appl. No.: 282,178

[22] Filed: Jul. 29, 1994

Related U.S. Application Data

[63] Continuation-in-part of Ser. No. 197,631, Feb. 10, 1994, which is a continuation-in-part of Ser. No. 45,552, Apr. 9, 1993, Pat. No. 5,364,132, which is a continuation-in-part of Ser. No. 650,221, Feb. 4, 1991, abandoned.

[51] Int. Cl.⁶ .................... G04B 17/00; G09F 19/00
[52] U.S. Cl. ..................................... 368/327; 116/200
[58] Field of Search .................. 368/327; 116/200

[56] References Cited

U.S. PATENT DOCUMENTS

| | | |
|---|---|---|
| 2,088,567 | 8/1937 | Ballou . |
| 3,999,946 | 12/1976 | Patel et al. ............... 23/253 |
| 4,212,153 | 7/1980 | Kydoniers et al. ........ 368/62 |
| 4,292,916 | 10/1981 | Bradley et al. ........... 116/208 |
| 4,408,557 | 10/1983 | Bradley et al. ........... 116/206 |
| 4,432,630 | 2/1984 | Haas ............................. 355/1 |
| 4,573,711 | 3/1986 | Hyde ........................... 283/98 |
| 4,643,122 | 2/1987 | Seybold ..................... 116/206 |
| 4,812,053 | 2/1989 | Bhattacharjec ........... 374/102 |
| 4,846,502 | 7/1989 | Chang et al. ............... 283/57 |
| 4,903,254 | 2/1990 | Haas .......................... 368/327 |
| 4,987,849 | 1/1991 | Sherman .................... 116/206 |
| 5,058,088 | 10/1991 | Haas et al. ................. 368/327 |
| 5,107,470 | 4/1992 | Pedicano et al. ........ 368/327 |

FOREIGN PATENT DOCUMENTS 9106853 5/1991 Germany .
9213724 11/1993 WIPO .

Primary Examiner—Bernard Roskoski
Attorney, Agent, or Firm—Weingram & Zall

[57] ABSTRACT

A time indicator is provided that changes color or produces an image or information after a specific time interval. The time indicator includes a base substrate with colored dye deposited on a first surface; and a substrate having an adhesive on a first surface thereof, the adhesive positioned at discrete locations on the first surface of the substrate. The substrate and the base substrate are put into adhesive contact. The adhesive contacts and coacts the colored dye to dissolve the dye and permit the dye to migrate through the adhesive to cause a color change visible through the substrate. The discrete adhesive inhibits lateral migration of the dye to preserve the image or information of the dye in a clear and/or understandable condition.

16 Claims, 4 Drawing Sheets

5,446,705

TIME INDICATOR HAVING DISCRETE ADHESIVE

RELATED APPLICATIONS

This application is: a continuation-in-part of U.S. patent application Ser. No. 08/197,631, filed Feb. 10, 1994, by Haas et al. pending, which is a continuation-in-part of: U.S. patent application Ser. No. 08/045,552 filed Apr. 9, 1993, by Haas, et al., now U.S. Pat. No. 5,364,132, which is a continuation-in-part of: U.S. patent application Ser. No. 07/650,221 filed Feb. 4, 1991, to Haas, et al., now abandoned.

BACKGROUND OF THE INVENTION

Other related application are: U.S. patent application Ser. No. 07/955,469 filed Oct. 2, 1992, by Haas, et al. pending, U.S. patent application Ser. No. 07/602,120, filed Oct. 22, 1990 by Haas, et al. pending, U.S. patent application Ser. No. 07/771,765, filed Oct. 4, 1991, pending.

The entire disclosures of all of the foregoing applications are incorporated herein by reference.

1. Field of the Invention

The present invention relates to a time indicator for indicating the passage of a relative amount of time of the type employing an adhesive activator and a migrating ink, and in particular, to a time indicator having discrete or discontinuous adhesive for preventing lateral migration of migrating ink.

2. Description of the Prior Art

Simple film and paper time indicators are currently being manufactured employing two technologies. One is an opaque film technology which employs dyes diffusing through an opaque film. The second is a clear film technology which employs a dot pattern of permanent pigment dyes and migrating dyes such that as the migrating dye dots enlarge in size, they develop out a visible image.

Both of these technologies are covered in U.S. Pat. Nos. 4,903,254 dated Feb. 20, 1990, and U.S. Pat. No. 5,058,088 dated Oct. 15, 1991 to David J. Haas, the entire disclosures of which are incorporated herein by reference. These indicators are useful for indicating the passage of time intervals. However, when information is included on such indicators, such as words or numbers, after time, such information may become obscured as a result of an "over-migration" of the ink.

The prior work in this area has yet to solve the problem of preserving information on such time indicators in an understandable condition.

Known devices and methods related to this technology include the following:

U.S. Pat. No. 3,018,611 to Biritz describes a time indicator device which may be used on frozen foods, and for indicating parking times, construction periods, etc. The device comprises a backing which is attachable to the outer surface of, for example, a package of frozen food. Superimposed on the backing is a strip of filter paper having a chemical reagent laminated thereto. The chemical reagent is an oxygen reactive material. The strip is hermetically sealed by a covering of transparent, impervious pressure sensitive cellophane which allows visual inspection of the oxygen reactive layer. A pin-hole size opening is provided in the covering to allow for ingress of air within the interior of the container. This opening is sealed by a removable tape. When the tape is removed the oxygen reactive material reacts to change color by permitting air to enter and diffuse into the container to make contact with the material. The pin-hole opening is provided at one end of the container and as time proceeds, the color proceeds toward the other unexposed end of the container.

U.S. Pat. No. 3,480,402 to Jackson, describes a time indicator formed of an absorbent carrier having absorbed thereon at least one chemical compound which changes color upon exposure to oxygen. The carrier and chemical compound absorbed thereon are protected from ambient oxygen by a non-perforated barrier layer which is transparent and through which atmospheric oxygen can controllably diffuse over a preselected period of time. Thus, when the chemical compound changes color, the preselected period of time is indicated. The graduated time indicator may be produced by utilizing more than one chemical or a layer covering the various pieces of absorbent material of different thickness. For each piece of absorbent material, the chemical absorbed on the piece of absorbent material would change color at different times, e.g., the chemical on one piece would change color after, say, one week, and the chemical absorbed on another piece would change color after ten days, and the chemical on a further piece of absorbent material would change color after fourteen days. Thus, a graduated time indicator is described.

U.S. Pat. No. 3,520,124 to Myers, describes a parked car time indicator which includes a first sheet having a first reactant and a second sheet having a second reactant, and a release sheet, which is peeled away to permit contact of the first sheet with the second sheet to start a reaction over a selective time interval terminating with a color change of the reactants.

U.S. Pat. Nos. 3,954,011 and 3,962,920 to Manske, describes a time indicating device suitable for visibly measuring parameters such as time, temperature and time-temperature relationships. The device includes a porous fluid-carrying pad, a wick material for said fluid and an indicator means whereby the progress of fluid along the wick material can be visibly indicated and used to measure the passage of time, the exposure to a given minimum temperature or time-temperature relationship.

U.S. Pat. No. 4,028,876 to Delatorre describes an apparatus for visually indicating elapsed time by a color change which comprises a transparent container having a rupturable capsule therein and in which a first composition is contained. A transparent matrix surrounds the second composition which is also in the container. The device may be secured to a surface by means of a mechanical fastener or an adhesive layer.

U.S. Pat. No. 4,212,153 to Kydonieus, et al describes a laminated indicator which changes in a visually perceptible mode with the passage of time. The indicator comprises at least two layers whereby the molecular migration of an agent in an interior layer to the outermost surface of the exterior layer causes a change which is visually perceptible. This reference also describes the use of a step-wedge test color panel placed next to the indicator which is used to compare the developed color or shade. The step-wedge can be provided with indicia corresponding to the time period required to develop the color at each step of the wedge.

Attention is also drawn to U.S. Pat. No. 4,903,254, which is an improvement of the aforementioned Kydonieus et al. patent. It provides a time indicator badge which provides a clear indication of the expiration of time.

U.S. Pat. No. 4,229,813 to Lilly, et al describes a time indicator which utilizes a silicon oil which is slowly absorbed onto and moves up a porous strip at a rate which is a function of time. One side of the strip is printed with an oil soluble ink, while the other side is unprinted. The printed side of the strip is laminated with polyethylene film to an unprinted strip. As the silicon oil moves up the strip, the oil contacts the ink causing a dye in the ink to migrate from the printed side to the unprinted side, thus providing a measurable color front moving up the strip.

U.S. Pat. No. 4,382,700 to Youngren describes an indicator which contains a mineral jelly which is in contact with a wick, such that the mineral jelly diffuses into the paper in accordance with the changes in ambient temperature over a period of time.

U.S. Pat. No. 4,408,557 to Bradley, et al describes a timer comprising an absorptive layer disposed on a base layer which accepts a carrier mixture at a predetermined rate. A barrier means is disposed between the carrier mixture and the absorptive layer, and the removal of the barrier activates the timer.

U.S. Pat. No. 4,629,330 to Nichols describes a color change indicator which includes a liquid having a predetermined index of refraction and a rate of evaporation, a reservoir for holding liquid, and an opacifying layer of microporous material. The opacifying layer has an index of refraction approximately the same as that of a liquid and overlies the reservoir. The opacifying layer has an open cell network of pores for absorbing liquid from the reservoir and is in a first radiation scattering condition when the liquid occupies the opacifying layer, and in a second scattering condition when the liquid is depleted from the opacifying layer.

U.S. Pat. No. 4,643,122 to Seybold describes a diffusion controlled security tag comprising a tarrier containing a solution of a compound which changes color upon diffusion or evaporation of the solvent. The carrier is enveloped in a barrier film which controls the rate of diffusion/evaporation of the solvent from the carrier, such that a change in color of the carrier indicates undesirable storage or product tampering.

U.S. Pat. No. 5,107,470 to Pedicano, et al. discloses an indicator wherein a migrating ink bleeds through an opaque layer where it can be seen. The Pedicano device has a base portion and an indicator portion. The base portion includes a clear impermeable base coated onto a non-curing coating having a release sheet. The clear impermeable base carries printed ink, a portion of which contains a migrating agent. The indicator layer includes a clear impermeable top layer, a non-curing indicator layer coating and an indicator release sheet. The non-curing indicator layer coating, upon activation of the indicator, is exposed to and put into adhering contact with base layer to contact the printed ink. Indicator layer is preferably an opaque plasticizer-vinyl-titanium dioxide mixture. This opaque layer provides a background for message display and obscures the non-migrating camouflage component of the printed ink.

One of the problems associated with all of the foregoing devices is that information associated with the time indicator becomes difficult to read as time passes and the ink over-migrates.

None of these references teach or suggest applicant's invention as claimed herein. Applicant, with its invention has met a need that exists for an indicator which is inexpensive and can clearly, relatively accurately and quickly indicate the passage of a time intervals and preserve information contained on such indicator in a comprehensible form.

OBJECTS AND SUMMARY OF THE INVENTION

It is an object of this invention to provide a time indicator device with a message which can provide the user with a clearly readable message.

It is a further object of this invention to provide a time indicator device having a message wherein the message is preserved in a comprehensible form after the passage of a selected time interval.

It is still a further object of this inventions to provide a time indicator with migrating ink, which migrating ink is retarded from over-migrating.

It is another object of the present invention to provide a time indicator with migrating ink, which migrating ink is prevented from migrating laterally.

It is still another object of this invention to provide a time indicator that includes a discrete or discontinuous adhesive to prevent over-migration of a migrating ink.

It is an additional object of the present invention to provide a time indicator wherein the adhesive activation is printed in lines to prevent the migrating ink from migrating laterally.

It is a further object of the present invention to provide a time indicator that eliminates the problem of incomprehensible information because of over-migration of the migrating ink.

The present invention is directed to providing a time indicator having a discrete or discontinuous adhesive which prevents the ink from migrating laterally. This invention works with the use of time indicators employing opaque films or opaque adhesives, as well as with time indicators employing a clear film and printed dots of permanent and migrating inks. Importantly, the discrete adhesive of the present invention is placed over the migrating inks or dyes and into adhesive contact therewith. The discrete adhesive contacts the migrating ink and coacts with the migrating ink to dissolve the ink and cause the ink to migrate along the surface of the indicator. Thus, over-migration of the ink is prevented because the ink or dye does not bleed or migrate laterally beyond the discrete adhesive segments which it contacts.

The present invention also provides a time indicator that rapidly changes color after a specific time interval comprising: a base substrate with colored dye deposited on a first surface; and a substrate having a discretely positioned adhesive on a first surface thereof; wherein the substrate and the base substrate are put into adhesive contact, the discrete adhesive contacts and coacts with the colored dye to dissolve the dye and permit the dye to migrate through the discrete adhesive to cause a color change visible through the substrate.

The time indicator of the present invention includes a base substrate with colored dye deposited on a first surface. Also included is a top substrate having an adhesive positioned at discrete locations on a first surface of the top substrate. When the top substrate and the base substrate are put into adhesive contact, the adhesive contacts and coacts with the colored dye to dissolve the dye and permit the dye to migrate through the adhesive to cause a color change visible through the substrate. The adhesive positioned at discrete locations inhibits lateral migration of the colored dye and preserves the visible color change.

BRIEF DESCRIPTION OF THE DRAWINGS

For a more complete understanding of the present invention, reference may be made to the following Detailed Description of the Invention of the present invention, considered in connection with the accompanying drawings, in which.

DETAILED DESCRIPTION OF THE INVENTION

Figure 1:
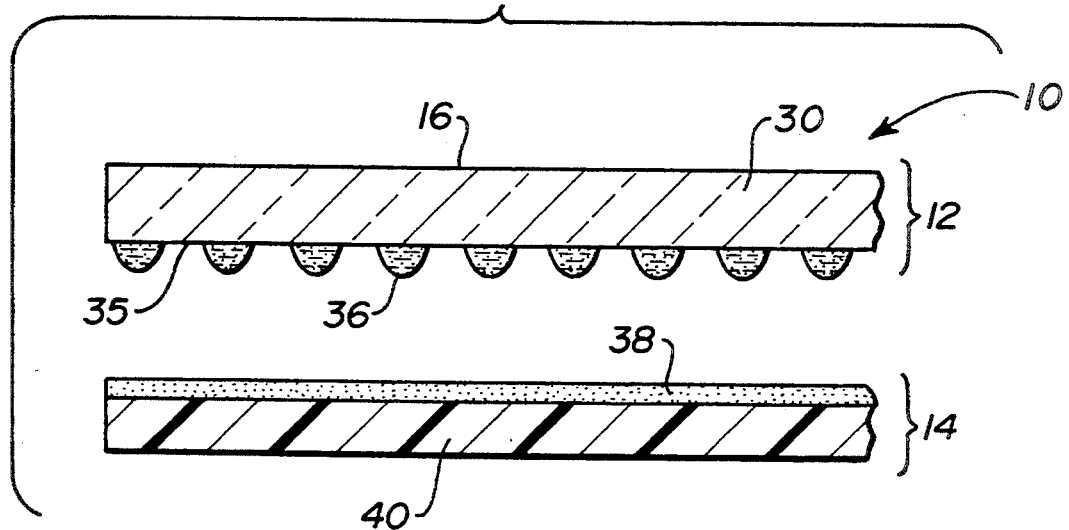
FIG 1 is a cross-sectional view of the time indicator of the present invention prior to activation.
Figure 2:
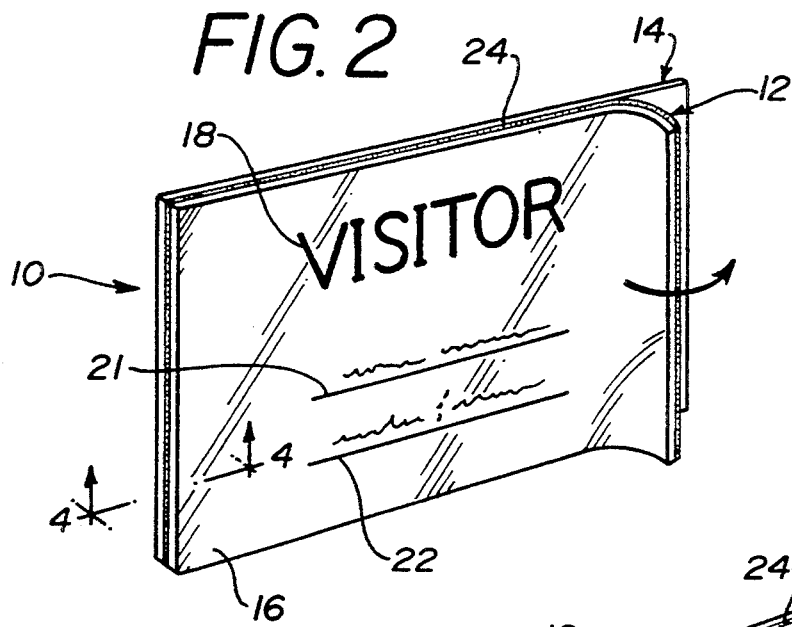
FIG. 2 is a perspective view of a time indicator badge according to the present invention.
Figure 3:
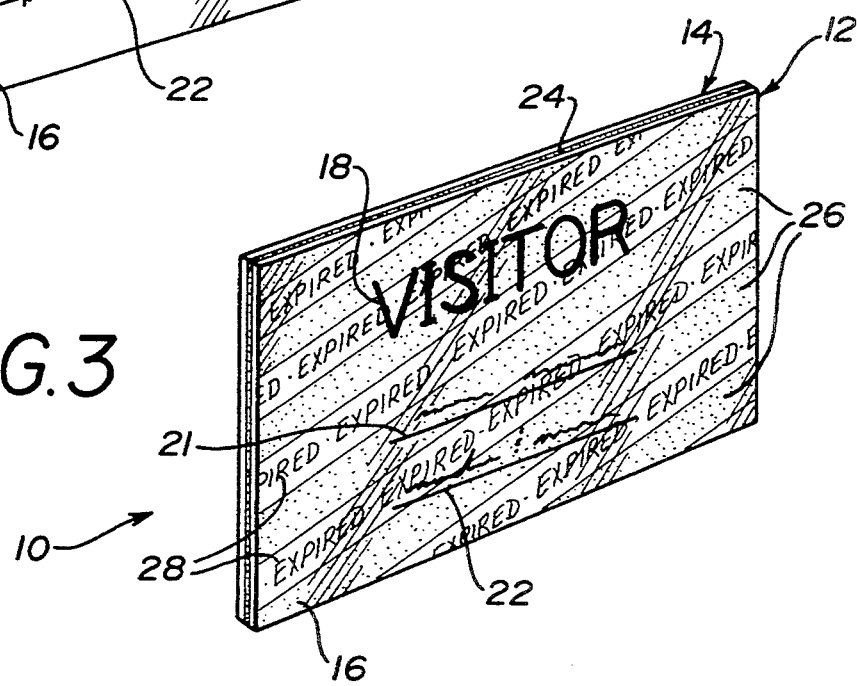
FIG. 3 is a perspective view of the time indicator badge of FIG. 1 after the expiration thereof.

As shown in FIG. 1, the time indicator of the present invention, generally indicated at 10, is provided in two parts: the front part 12, and the back part 14. The front part 12 includes a substrate 30 which may be clear or opaque depending on the type of indicator being used. It includes a support film, which may be an acetate or polyester film, having display surface 16 and a pressure sensitive layer, i.e. adhesive 36, on one side thereof. The pressure sensitive adhesive 36 is located at discrete positions on substrate 30. As used throughout this specification, the term "discrete adhesive" or variations thereof means "consisting of unconnected distinct parts of adhesive." The discretely positioned adhesive 36 has gaps or spaces 35 between adjacent areas of adhesive 36. The adhesive 36 may be positioned in discrete areas by random or uniform application of the adhesive 36 to the substrate 30. The adhesive 36 could be applied to the substrate 30 in a dot pattern or in parallel lines of adhesive being with adjacent lines of adhesive being separated by gaps 36 or in any other manner, as long as the adhesive is not continuous, i.e. discontinuous. If, for example, the adhesive is applied in such parallel lines, the lines could be segmented along the length thereof to provide for greater discontinuity.

The back part 14 of the time indicator 10 of the present invention includes a support surface 40 and, on one side thereof, a migrating ink or dye 38. Upon activation of the time indicator of this invention, the first part 12 is put into contact with the back part 14, the discrete adhesive 36 contacts the migrating ink or dye 38 to dissolve the ink or dye to produce a color change.

One may begin the timing process by simply applying the front part 12 onto the back part 14. The discrete adhesive 36 on the front part 12 adheres to the back part 14. Upon contact, the discrete adhesive 36 dissolves the dye 38 into the discrete adhesive 36 on the front part 12 to cause a color change or to cause an image or information to appear. Thus, color or image appearance signals the end of the time interval and hence, that the time indicator has performed its task. The discrete adhesive 36 prevents the dye 38 from migrating laterally, across the contact area before the front part 12 and back part 14, thereby preserving the image or information in a clear, understandable condition.

As shown in FIGS. 2–5, a time indicator badge for use by a visitor to a facility, which expires after a specific time interval, is generally indicated as 10. The badge 10 comprises a front part 12 and a back portion 14 having stripes printed with ink 38 that migrates through the front portion 12. When a badge 10 is issued, the discrete adhesive 36 on the front portion 12 is placed over the back part 14 to begin the timing process. The discrete adhesive 36 contacts and coacts with the ink 38 to dissolve the ink 38. The ink 38 then passes or migrates through the badge to the front portion 12 whereupon the printed stripes become visible, thus alerting a guard or other security personnel that the badge has expired. Again, the discrete adhesive 36 prevents the ink 38 from migrating laterally, thereby preserving the printed stripes in a clear condition.

Figure 4:
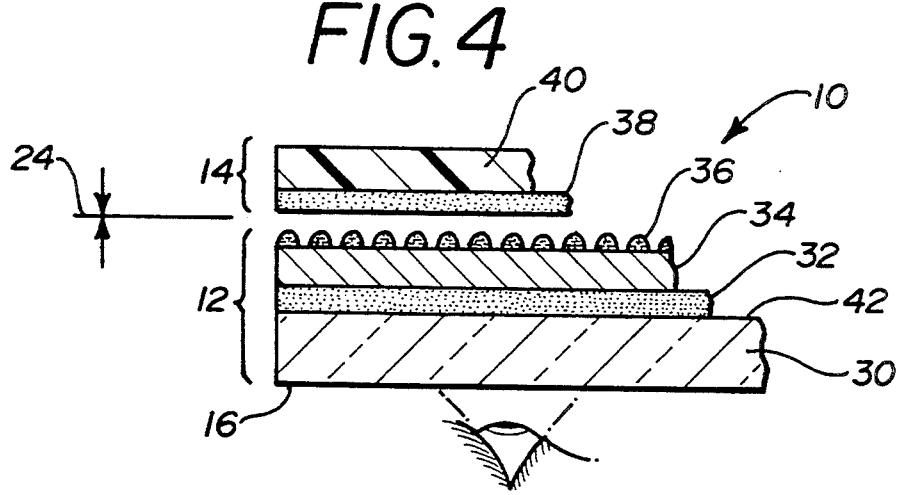
FIG. 4 is a cross-sectional view of the time indicator of FIG. 2.

On the front part 12 of the badge 10 is a front print display surface 16, which has the word "VISITOR" or other such terminology printed thereon. It may include a visitor name line 21 whereon the security person can write the name of the visitor. The badge may also include other information. After the ink 38 migrates to the front surface, a plurality of diagonal voiding bars 26 and a plurality of "EXPIRED" notice words 28 are displayed through the print display surface As shown in FIG. 4, the front part 12 has overlaying each other a transparent front support layer or clear plastic sheet 30, an ink display layer 32, a white or opaque layer 34 and a discretely positioned adhesive ink dissolver 36. Layer 32, 34, and 36 can be multiple, separate layers, or can be combined into one layer.

Transparent layer 30 is an impervious external support layer which is composed of an acetate film or polyester film. Ink display layer 32 is supported by transparent layer 30. Opaque layer 34 is supported by ink display layer 32 and acts as an optical barrier. A discrete adhesive and ink dissolver 36 is supported by the display layer 32.

The rear part 14 has a migrating red or other color ink patterned film or layer 38 and has a support card 40. The ink layer 38 is loosened and dissolved by the discrete adhesive and ink dissolver layer 36 after the front part 12 is joined to the rear part 14 along assembly joint 24. The ink pattern layer 38 is dissolved and then travels or migrates through layers 36, 34 and 32 to an ink display surface 42, on the layer 32.

When the badge 10 is issued, the self-adhesive front part 12 is placed over the rear part 14 and the time process begins. In this embodiment, badge 10 has a length of about three inches and a width of about two inches and a thickness of less than one-eighth inches. To issue badge 10, the desired data is filled out on the front surface 16, a release paper is pealed off the front part and front part 12 is placed over rear, part 14. The red or colored indicator marks 26 and the expiration words 28 appear after expiration of the approximate time period.

Transparent layer 30, which is a clear inert acetate film, has a selected thickness. Layer 30 provides mechanical support and rigidity, and supports adhesive and ink display layer 32. Transparent layer 30 also prevents passage of foreign inks or dyes from entering into layer 30 through the front print surface 16 of layer 30. Opaque film 34 is thin to provide a relatively short travel path for the migrating ink to permit it to pass rapidly therethrough to prevent dispersion.

Ink display layer 32 absorbs the patterned ink after the patterned ink migrates through layer 34.

Figure 5:
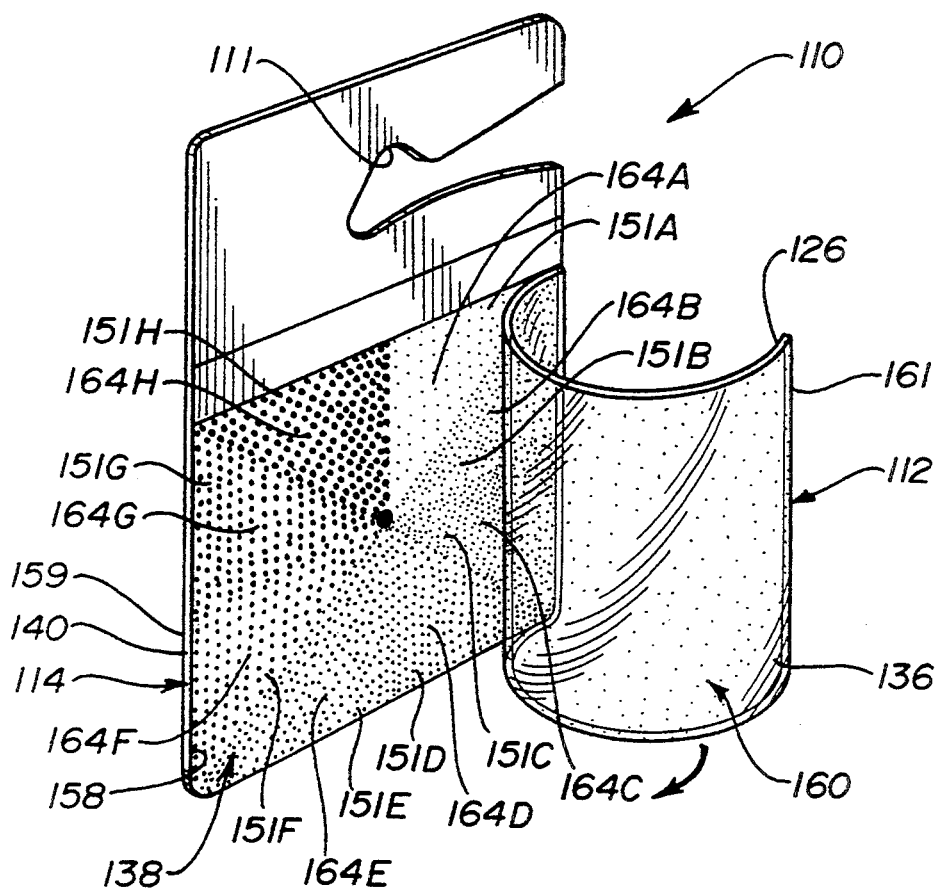
FIG. 5 is a perspective view of a parking time indicator according to the present invention.
Figure 6:
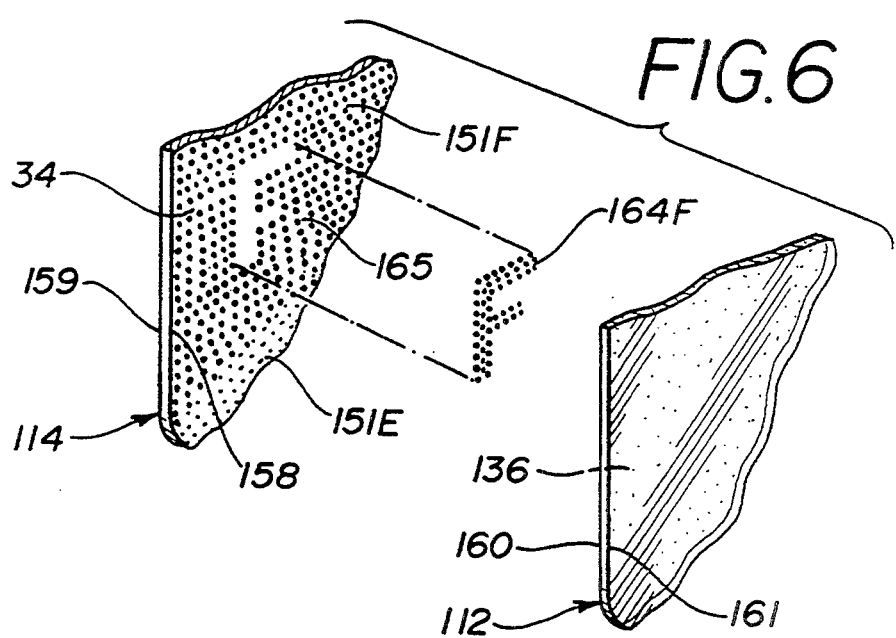
FIG. 6 is an exploded perspective view of a portion of the indicator of FIG. 5.
Figure 7:
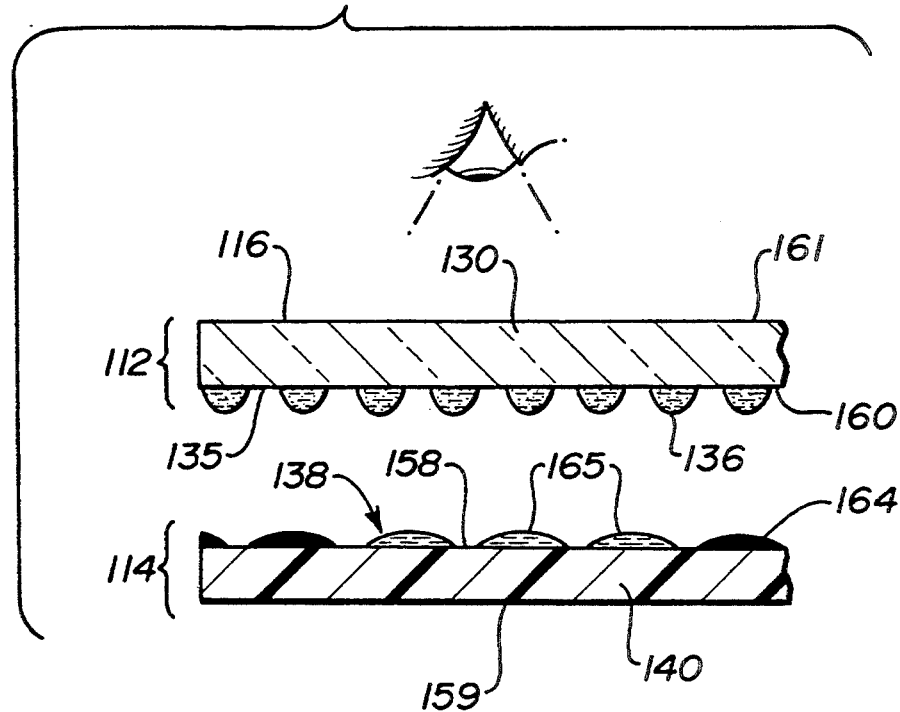
FIG. 7 is a schematic cross-section view of the time indicator of FIG. 5.

As shown in FIGS. 5–7, where similar reference numerals identify similar elements shown in the previous figures, another embodiment of the present invention comprises a parking permit or parking time indicator generally designated as 110, which may be conveniently hung from, for example, a rearview mirror of a car by slot therein. The indicator 110 comprises a first part 114 having a base 140 which has first and second surfaces 158 and 159. Substrate 140 may be made of cardboard, plastic, or any other material suitable for its intended use. Substrate 140 has thereon at least two indicia areas on the first surface 158. This invention, however, contemplates any number of indicia areas. The parking permit depicted FIG. 5 has eight adjacent triangular indicia areas 151A–151H arranged in a clockwise pattern. Each indicia area is designed to indicate the passage of an amount of time.

Still referring to these figures, and in particular FIG. 7, a second part or substrate 112 is provided which has first and second surfaces 160 and 161. In general, a first chemical agent or ink 138 is applied on each indicia area. A second chemical agent or adhesive 136 is applied on the first surface 160 of the second substrate 112. This adhesive 136 is applied to discrete locations on the first surface 160 of the second substrate 112, preferably in parallel lines having gaps 135 therebetween. When the first surfaces 158 and 160 of parts 114 and 112 overlay and in contact with each other, the second chemical agent 136 coacts with the first chemical agent 138 to dissolve the first chemical agent 138 to cause a visually perceptible change at the second surface 161 overlaying the first indicia area 151A, in a first time interval, and a visually perceptible change at the second surface 161 overlaying the second indicia area 151B in a second selected time interval. The discrete adhesive 136 prevents the lateral migration of the ink 138 thereby preserving the visually perceptible color changes in a clear condition.

The ink pattern provided in each of the indicia areas 151A–151H comprises a pattern of dots 164A–164H printed in a preselected pattern in each of the indicia areas. The use of the term "dot" includes not only the usual meaning of the word dot, i.e., a small round point, but also other type small points of ink print, for example, triangular, heart-shaped, etc.

Still referring to FIGS. 5–7, an indicia area 151 may have an ink pattern 164 which is surrounded by a pattern of background dots 165, preferably the same color as the ink pattern 164, which do not develop or change over a period of time. Ink pattern 164 is preferably a soluble ink pattern which, when placed in contact with the adhesive 136, which includes a solvent for the soluble ink, dissolves so that the dots of the pattern bleed into each other. The background dots 165 are printed with an insoluble ink and thus do not bleed together when in contact with the adhesive.

Preferably, the color changing backpart and the timing cover frontpart are stable and have a shelf life at ambient temperature of at least 2 years. Additionally, it is desirable that the assembly and construction materials are relatively inexpensive so that the indicator is relatively inexpensive. Further, the components of the indicator should be flexible and food safe because of application to edible, pharmaceutical and other consumer products.

The materials used in construction of the indicator should show relatively low temperature sensitivity in order to minimize the time-temperature effect. Typically, the indicator will be used at normal room temperature where the average ambient temperature range will be 70° to 85° F., and refrigerator temperature where the range will be 40° to 45° F.

Preferred inks for use with this invention are from Gans Ink Company, Los Angeles, Calif. In particular, Pyroscript Sublimation Inks, e.g. Ink Nos. 57977, 57976; Heat Transfer Inks, Turn-A-Bout, Sunrise Process, Sunburst Process and Turn-A-Bout R.S. Series inks. Sublimation and heat transfer type inks are generally low molecular weight dyes that can bleed. Standard inks which do not bleed include particles, i.e., finely ground non-migrating solids (vis-vis molecules) which provide deep colors.

Almost any adhesive which is receptive to the dyes and inks can be used. By adding polar and/or non-polar materials to the adhesive the absorption properties of the adhesive can be altered. Preferred adhesives are from Avery Company, Fasson Films Division, Painesville, Ohio.

The time indicator of this invention has many uses, including, but not limited to: a self-timing sticker for visual validation of an access card; a safety sticker that develops out warning words such as Dangerous after specific time intervals; a self-timing retail sticker that voids itself; a time temperature food spoilage indicator; an indicator sticker for biological industrial processes, laboratory experiments, field testing, etc. where a clock or timer is impractical or too expensive; a service sticker that shows words such as "Service Required" after a service or preventative maintenance time interval; a property pass, luggage tag, or barcoding sticker that self-expires to prevent re-use; a shipping sticker that changes color to flag urgent or dated shipments that are overdue or about to be missed; an i.d. admission bracelet that self-expires after a time interval; a ski ticket or entertainment park pass that self-expires; a tollbook, bus/train pass, that develops out the word expired after a specific time intervals.

Importantly, the time indicator of the present invention with discrete adhesive can be used with a long term rapid color changing time indicator like that disclosed in co-pending U.S. patent application Ser. No. 08/197,631 filed Feb. 10, 1994, by Haas, et al. As such, a dissolvable barrier may be placed over the migrating ink to protect the ink from activation for a long period of time. The discrete adhesive contains a dissolver which dissolves the barrier in a time period. Thus, no color change occurs for the majority of the time interval because the ink does not bleed because the ink does not contact the adhesive until after the barrier is penetrated. When the dissolver in the adhesive does breach the barrier, the discrete adhesive coacts with the migrating ink to cause the ink to rapidly dissolve into the adhesive to cause a rapid color change. Importantly, the discrete adhesive prevents lateral migration of the ink and preserves the image created by the ink in a clear condition.

Having thus described my invention in detail, it is to be understood that the foregoing description is not intended to limit the spirit and scope thereof. What is desired to be protected by Letters Patent as set forth in the appended claims.

What is claimed is:

1. A time indicator comprising:

a base substrate with colored ink deposited on a first surface; and a top substrate having a first surface and a second surface, the first surface having thereon unconnected discrete areas of an adhesive;

wherein when the first surface of the top substrate and the first surface of the base substrate are put into adhesive contact, the areas of the adhesive contact and coact with the colored ink to dissolve the ink and permit the ink to migrate through the adhesive to cause a color change visible through the top substrate, the unconnected discrete areas of adhesive inhibiting lateral migration of the colored ink between the unconnected discrete areas of adhesive.

2. The apparatus of claim 1 wherein the unconnected discrete areas of the adhesive are parallel areas.

3. The apparatus of claim 2 wherein the time indicator is a security badge.

4. The apparatus of claim 3, wherein the second surface of the top substrate comprises an indicia area for identifying a user of the badge.

5. A time indicator comprising:
a front part and a rear part;
the front part comprising:
i) a transparent front support layer with a front print display surface;
ii) an ink display layer with a front ink display surface, the front ink display surface overlaying the support layer;
iii) an opaque layer overlaying the ink display layer;
iv) an adhesive ink dissolver layer of unconnected discrete areas of an adhesive ink dissolver overlaying the opaque layer;
the rear part comprising a back support layer having on one surface thereof:
i) a back support layer;
ii) an ink layer including a migrating ink;
wherein when the adhesive ink dissolver layer of the front part is placed in contact with the ink layer of the rear part, the ink dissolver layer contacts the ink layer to cause the ink to migrate through the ink dissolver layer, the opaque layer, and the ink display layer to the front ink display surface where it can be viewed through the transparent front support layer, the unconnected discrete areas of the adhesive ink dissolver inhibiting lateral migration of the colored ink between the unconnected discrete areas of adhesive ink dissolver.

6. The apparatus of claim 5 wherein the unconnected discrete areas of the adhesive ink dissolver layer are parallel areas.

7. The apparatus of claim 6 wherein the indicator is a security badge.

8. The apparatus of claim 7, wherein the front print display surface includes an indicia area for identifying a user of the badge.

9. A time indicator comprising:
a first substrate having first and second surfaces and at least one indicia area on the first surface;
a second substrate having first and second surfaces;
an ink pattern of dots printed in a preselected pattern in the at least one indicia area;
an adhesive activator means having unconnected discrete areas of adhesive activator on the first surface of the first substrate;
wherein, when the first surface of each substrate are in contact and overlay each other, the adhesive activator contacts and coacts with the ink pattern of dots to cause the ink pattern of dots to gradually bleed and blend together along the first surfaces of the substrates to cause a change visually perceptible through the second substrate overlaying the indicia area, the unconnected discrete areas of the adhesive inhibiting lateral migration of the ink between the unconnected discrete areas of adhesive.

10. The apparatus of claim 9 wherein the unconnected discrete areas of the adhesive activator are parallel areas.

11. The apparatus of claim 10 wherein the time indicator is a parking permit.

12. The apparatus of claim 10 wherein the time indicator is a security badge.

13. The apparatus of claim 10 wherein the time indicator is a wrist band.

14. The apparatus of claim 10 wherein the time indicator is a self-expiring label.

15. A time indicator comprising:
a transparent front support layer;
an ink display layer overlaying said support layer;
an opaque ink dissolver layer of unconnected discrete areas of adhesive overlaying the ink display layer;
an ink layer including a migrating ink overlaying the opaque layer;
a back support layer overlaying the ink layer;
whereby when the opaque ink dissolver layer contacts the ink layer to cause the ink to migrate through the opaque ink dissolver layer to the ink display layer where it can be viewed through the front support member, the adhesive areas positioned at discrete locations inhibit lateral migration of the colored ink between the unconnected discrete areas of adhesive.

16. The apparatus of claim 15 wherein the unconnected discrete areas are parallel areas.

* * * * *